(No Model.)

F. H. RICHARDS.
ROD CUTTING APPARATUS.

No. 572,374.

5 Sheets—Sheet 1.

Patented Dec. 1, 1896.

Witnesses:
R. W. Pittman
Fred. J. Dole.

Inventor:
F. H. Richards (No Model.)  5 Sheets—Sheet 2.

F. H. RICHARDS.
ROD CUTTING APPARATUS.

No. 572,374.  Patented Dec. 1, 1896.

Witnesses:
R. W. Pittman
Fred. J. Dole.

Inventor:
F. H. Richards.

(No Model.)  
F. H. RICHARDS.  
ROD CUTTING APPARATUS.

No. 572,374. Patented Dec. 1, 1896.

5 Sheets—Sheet 3.

Witnesses:  
R. W. Pittman  
Fred. J. Dole.

Inventor:  
F. H. Richards.

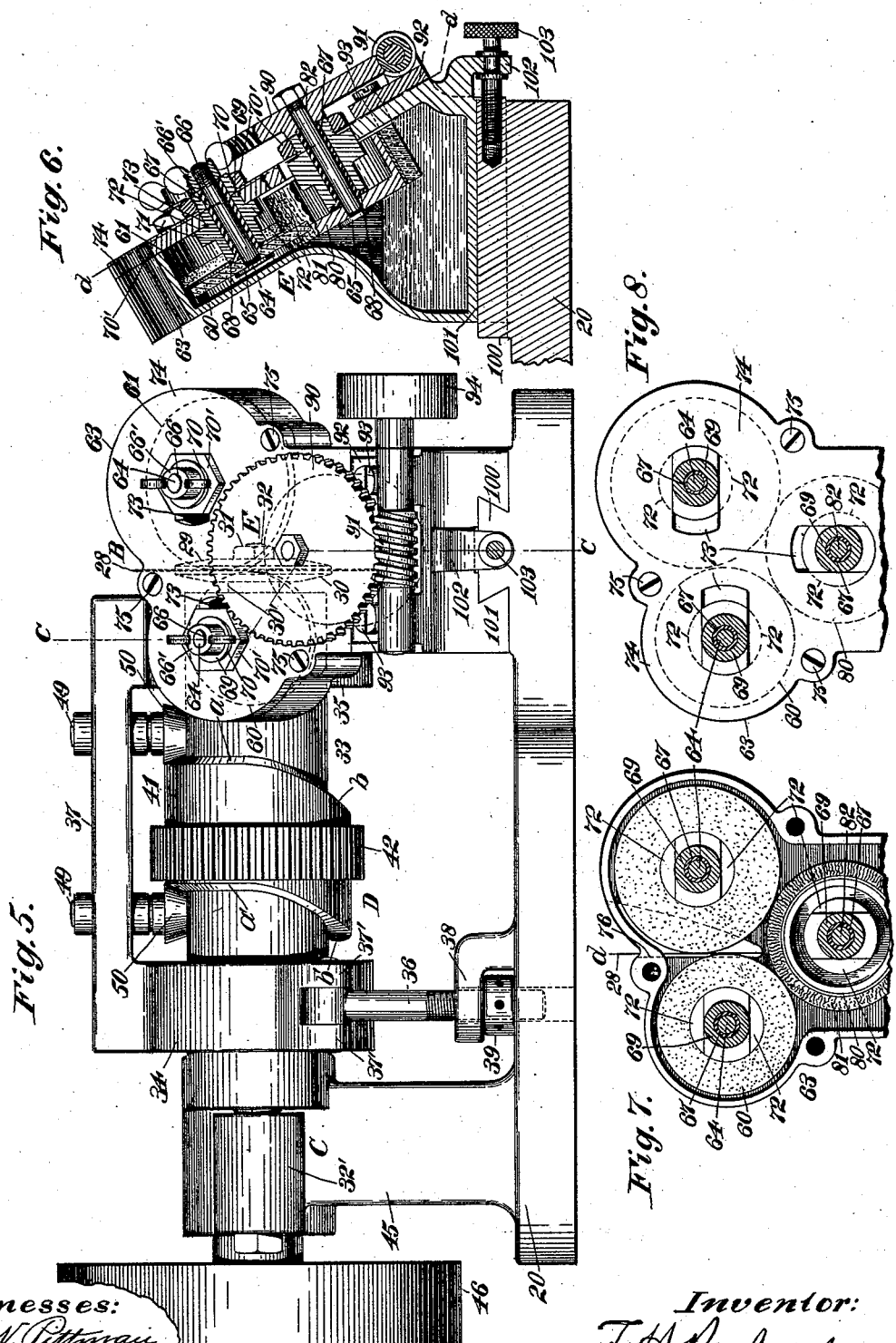

(No Model.)　　　　　　F. H. RICHARDS.　　　　5 Sheets—Sheet 5.
ROD CUTTING APPARATUS.
No. 572,374.　　　　　　　　　　　Patented Dec. 1, 1896.
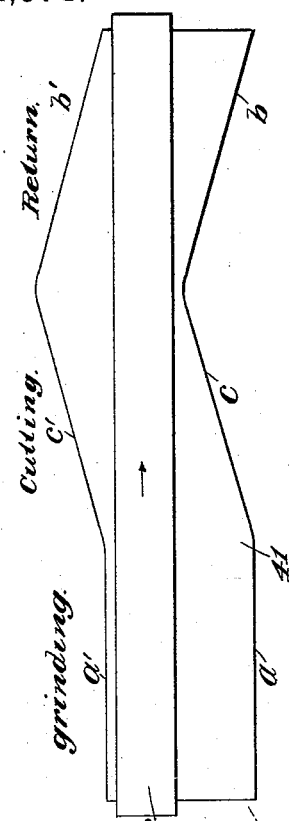
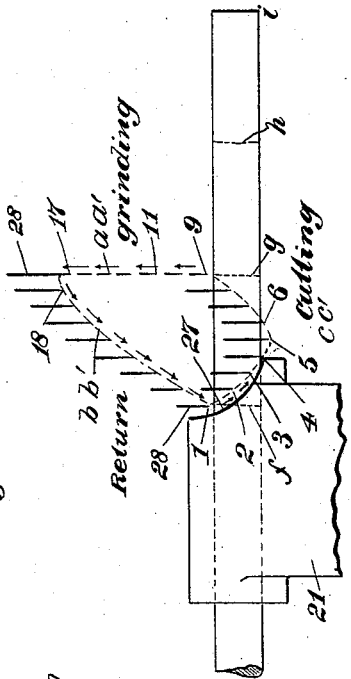
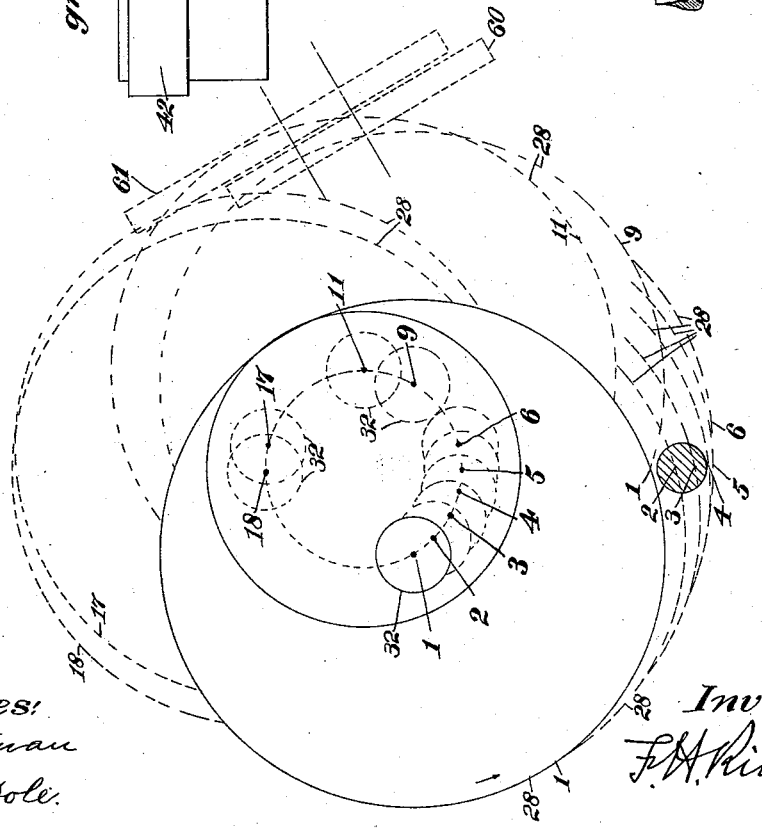
Witnesses:　　　　　　　　　　　　　　　Inventor:

UNITED STATES PATENT OFFICE.

FRANCIS H. RICHARDS, OF HARTFORD, CONNECTICUT.

ROD-CUTTING APPARATUS.

SPECIFICATION forming part of Letters Patent No. 572,374, dated December 1, 1896.

Application filed May 7, 1896. Serial No. 590,583. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Rod-Cutting Apparatus, of which the following is a specification.

This invention relates to mechanism or apparatus for severing or cutting rods, bars, or analogous articles formed of any shape and material, the object being to provide an improved rod-cutting apparatus or mechanism in which the cutting or severing device or tool thereof will have a rotary movement and during its rotation will be carried in an orbital or circuitous path toward and from the work, and will also have, simultaneously with its orbital movement and with the feeding of the work, a movement transversely of its orbital or circuitous path, whereby during a part of such orbital movement and the feed of such work it will move longitudinally with said work to sever the same, and which improved apparatus or mechanism will be, as compared with cutting or severing mechanisms of this character heretofore in use, simple in construction and effective in operation.

A further object of the invention is to provide automatically-operable means or mechanism connected or embodied with the cutting mechanism or apparatus whereby the severing or cutting tool or device will be ground or sharpened during its orbital and rotary movements, and preferably after each cutting or severing operation, and thereby alternately with such cutting operation, and whereby, also, the cutter will be kept clean and free from all foreign particles.

Figure 1:
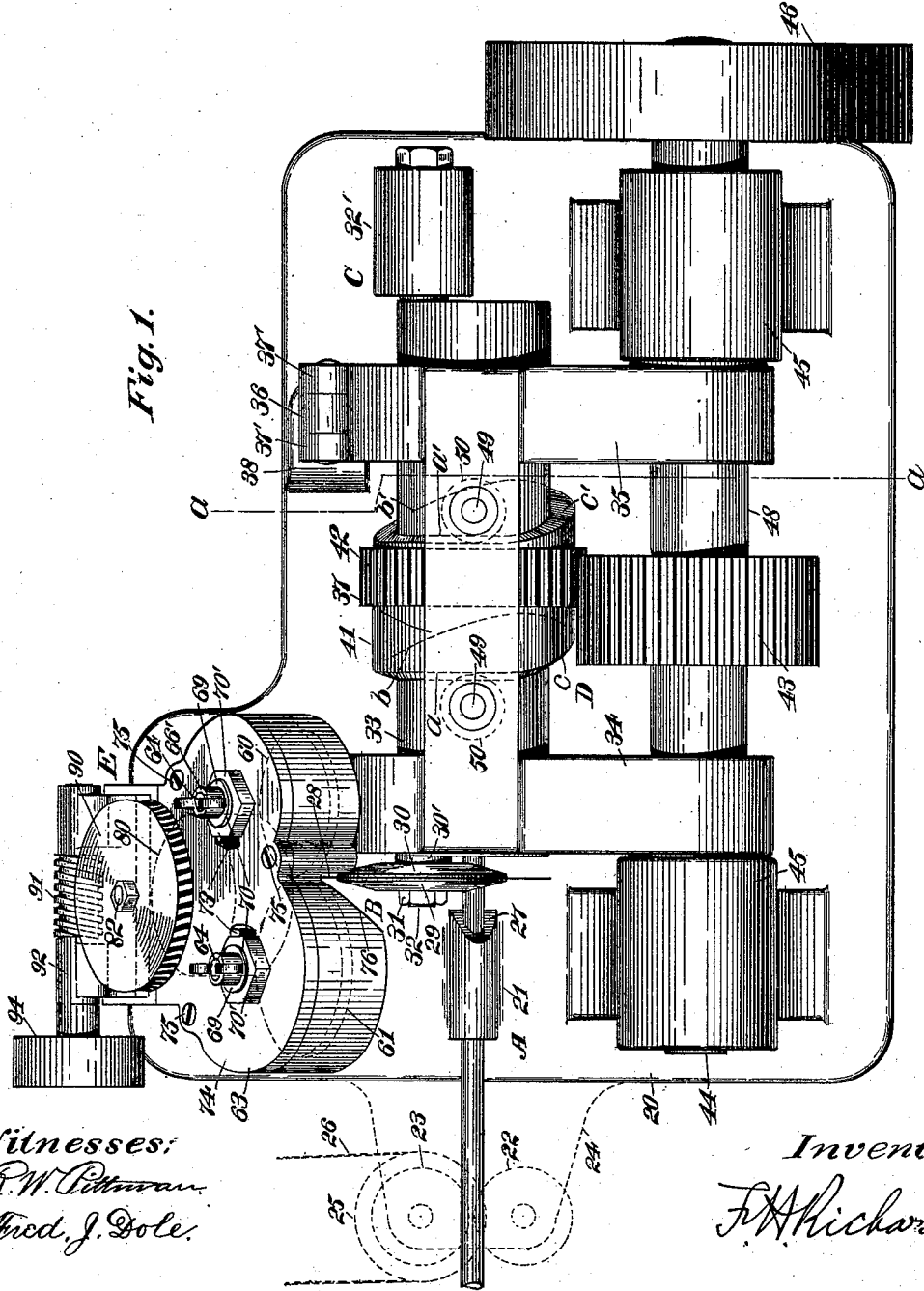
Figure 2:
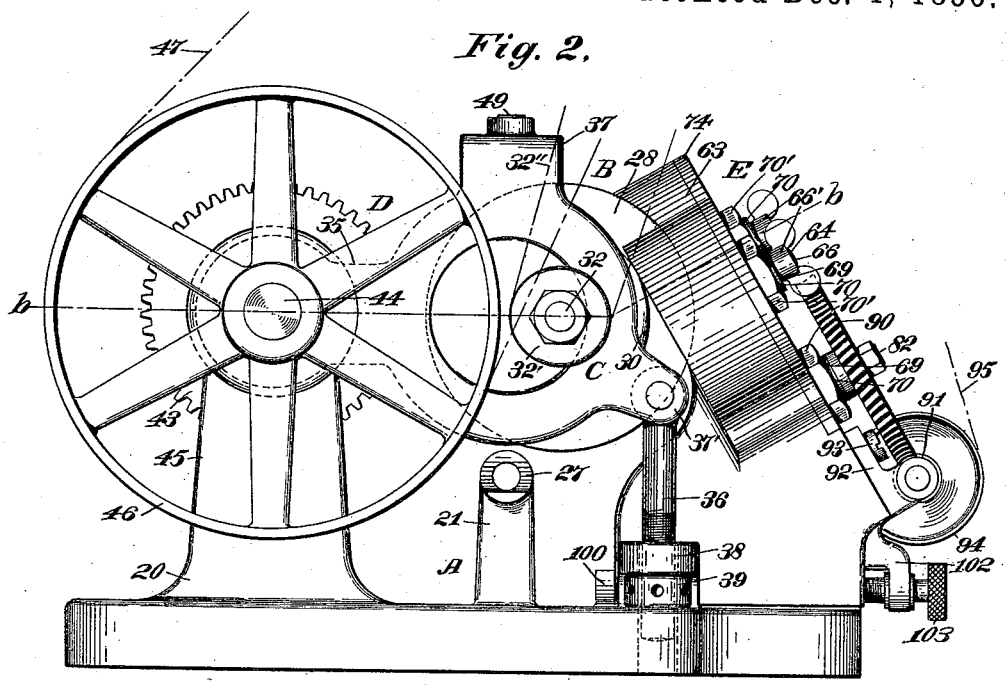
Figure 3:
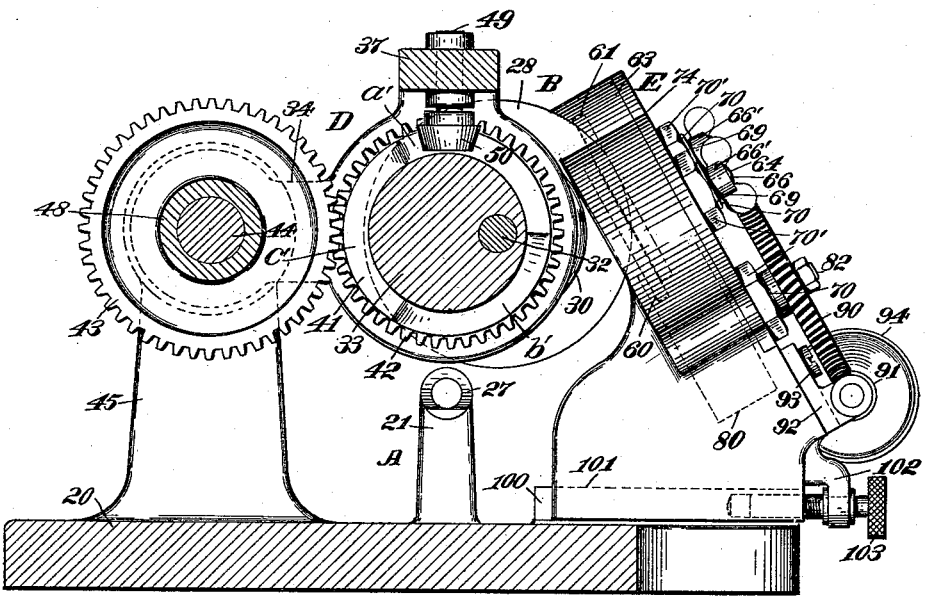
Figure 4:
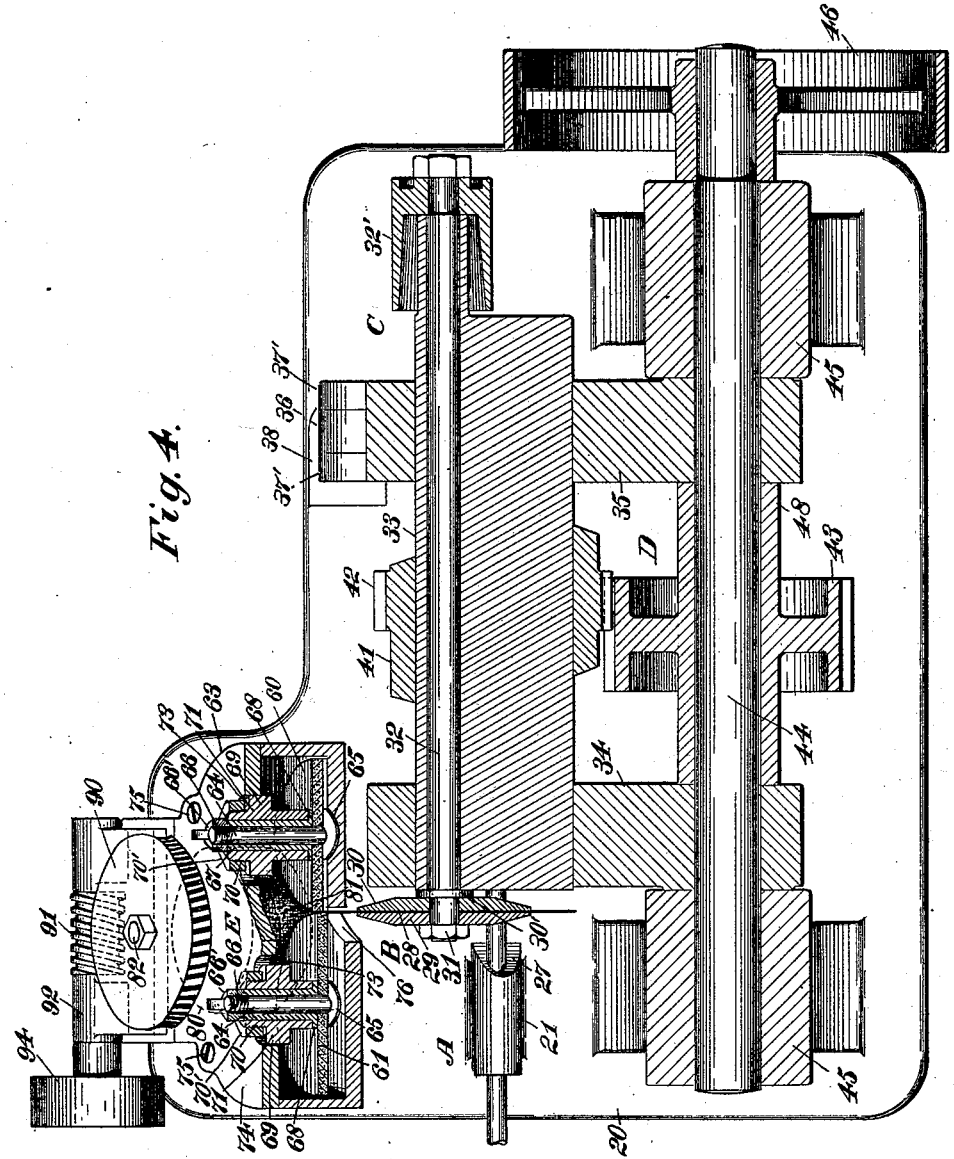

In the drawings accompanying and forming part of this specification, Figure 1 is a top view of this improved cutting or severing apparatus or mechanism and the improved cutter grinding or sharpening means in connection therewith. Fig. 2 is a right-hand end view of this improved apparatus or mechanism. Fig. 3 is a transverse sectional view thereof, taken in line *a a*, Fig. 1, and showing the improved cutter sharpening or grinding means in elevation. Fig. 4 is a horizontal sectional view of this improved mechanism, taken in line *b b*, Fig. 2, and showing parts of the apparatus in elevation. Fig. 5 is a rear view of this improved apparatus or mechanism. Fig. 6 is a transverse sectional view of the cutter grinding or sharpening means, taken in line *c c*, Fig. 5. Fig. 7 is a view of the cutter grinding or sharpening means having a part thereof broken away and illustrating the same as taken in line *d d*, Fig. 6, with the removable casing cover or cap detached, and looking toward the left hand. Fig. 8 is a view similar to Fig. 7 with the casing cover or cap in position. Fig. 9 is a view of the cam as seen when arranged on a plane surface. Fig. 10 is a diagrammatical view, on an enlarged scale, illustrating the various positions of the eccentrically-disposed cutter spindle or shaft and the cutter during the movement of said cutter in its orbital path to cut or sever the rod or article, and also illustrating the period of its sharpening operation; and Fig. 11 is also a diagrammatical view showing the various longitudinal or transverse positions of the cutter during its movement in its orbital path, and also illustrating the distance the work moves during such cutting or severing operation and the orbital movement of the cutter.

Similar characters designate like parts in all the figures of the drawings.

This improved cutting or severing apparatus or mechanism may be supported in any desired way upon any suitable frame or fixture, and comprises in a general way means (designated generally by A) for carrying or supporting and feeding the work—such as a rod, bar, or other article composed of any material—into position to be operated on; means (designated in a general way by B) for cutting or severing the work; means (designated in a general way by C) for rotating the cutting tool or device; means (designated in a general way by D) for actuating the cutting tool or device during its rotary movement and during the feeding movement of the work in an orbital or circuitous path toward and from such article and also for moving the same transversely of its orbital path or circuit, and means or mechanism (designated in a general way by E) for sharpening or grinding the cutting tool or device at a certain predetermined period in its orbital movement, said grinding or sharpening means or mechanism embodying means for automatically actuating the same.

The mechanism of this improved apparatus may be carried upon some suitable framework or fixture, as before stated, but it is herein shown as an open framework 20, whereby all the parts are readily accessible.

The rod carrying and feeding means A may consist of any desired means adapted for feeding the work into position to be operated on and supporting the same in such position, but it is herein shown, in a simple form thereof, as comprising a suitable longitudinally-bored support 21, carried upon the framework 20, and a pair of feed-wheels 22 and 23, preferably grooved and journaled for rotation on any suitable supporting means, such as a bracket 24 of the framework 20, the spindles or shafts of which feed-wheels are provided with a suitable driving-pulley 25, connected with any suitable source of power by a belt 26. This support 21 is beveled or cut away, as at 27, adjacent to its upper face, whereby the under side of the support will engage the rod or article, and thus permit the cutter to practically sever the same, before such rod or article has been fed away from its support.

The cutting or severing means, which is in the nature of a rotating tool and for the sake of brevity will be herein termed the "cutter," preferably comprises a metal disk 28, constructed of any desired metal adapted for the purpose. This disk is removably secured by suitable clamping members 29 and 30 and a clamping-nut 31 upon the end of a rotatable spindle or shaft 32 and in position to operate upon the work at a certain predetermined period in the movement of said disk in its orbital path, as hereinafter set forth.

A suitable washer 30' is interposed between the clamping member 30 and a portion of the rotatable spindle or shaft 32, having an enlarged diameter, whereby the disk will be firmly clamped by means of said clamping members 29 and 30 on its shaft. This spindle or shaft 32, through which the disk receives its rotary movement, is eccentrically journaled for rotation in suitable supporting means—such as a rotatable sleeve or hub 33—and carries, adjacent to one end thereof, a pulley 32', connected with any suitable source of power by a belt 32'', and whereby the shaft will be rotated, to thereby rotate the cutter continuously during the operation of the apparatus. This rotatable hub or sleeve 33, which comprises a part of the means for actuating the cutter in its orbital path toward and from the work to be operated on and also for actuating it in its longitudinal or transverse path, is journaled for such rotary and transverse movement in the framework or fixture 20, preferably by means of a bracket, (herein shown comprising a pair of bracket-arms 34 and 35, connected together by a brace bar or member 37.)

These bracket-arms 34 and 35 are adjustably supported on a shaft 44 (hereinafter described) and are adjustable relatively to the framework 20 by any suitable means, whereby the rotatable hub or sleeve, and thereby the disk or tool, can be adjusted toward and from the work, and thus provide for the wear of said disk. In the form shown this adjusting means comprises a threaded member 36, having its upper end journaled intermediate of a pair of ears or lugs 37', carried by one of the bracket-arms, as 34, and its lower threaded end extending through a support or bracket 38, carried on the fixture or framework 20, and on which threaded end a nut 39, having pin-holes, is secured, whereby on the actuation of the nut the adjustment above mentioned can be obtained in a manner that will be obvious.

In order to actuate the cutter 28 in an orbital or circuitous path, and thereby move the same toward and from the work to be severed, and also actuate said cutter synchronously with its orbital or circuitous movement and the feeding movement of the work in a path transversely of its orbital path or circuit, whereby said cutter will be actuated longitudinally with said work during a portion of its orbital movement and its cutting or severing operation and longitudinally of, or in a direction opposite to, the feed of such work during another portion of its orbital movement, to thereby bring the cutter again into its cutting position, suitable means adapted to accomplish this object is herein shown and described, which, however, may be varied without departing from the scope of this invention. In one form of this means, as preferably shown herein, the rotatably-journaled hub or sleeve 33, carrying the eccentrically-journaled spindle or shaft 32, is provided with a cam-wheel 41, disposed thereon and adapted to secure the transverse or longitudinal movement of said cutter 28, as hereinafter set forth. This cam-wheel has a suitable gear 42 encircling the same and meshing with a gear-wheel 43, splined or otherwise secured upon a rotatable shaft 44, journaled in suitable supports 45 of the fixture or framework 20, and which shaft 44 carries at one end thereof a driving wheel or pulley 46, splined or otherwise secured thereto and connected with any desired source of power by a belt 47, whereby on the rotation of said shaft 44 and gear 43 the hub or sleeve 33 is rotated in its journal, to thereby carry the cutter in its orbital path.

In the construction shown the gear 43 has its hub 48 preferably extending intermediate of the bracket-arms 34 and 35, to thereby prevent the displacement of the same, the opposite faces of said bracket-arms in this construction being adjacent to the supports 45, whereby they are securely held in position for adjustment.

To secure the transverse or longitudinal movement of said cutter, as above set forth, the cam-wheel 41 in this construction is shown preferably provided with similarly-formed oppositely-disposed cam-faces (herein shown as three in number) adapted to engage with the rollers 50 at the lower ends of a pair of projecting studs 49, secured to the brace bar or member 37, one of said studs being disposed at each side of the cam-wheel 41, whereby the rotatable hub or sleeve 33 is longitudinally carried or reciprocated in the brackets 34 and 35 of the fixture or framework 20 in a manner that will be obvious, the faces of the cam being so constructed as to accomplish this purpose. In the construction shown these cam-faces are so formed that they will at one period permit the cutter to be actuated in its orbital movement without transverse or longitudinal movement, and will at another period of its orbital movement actuate the cutter transversely of its orbital path, and thereby longitudinally of the work, or in a direction opposite to the feed thereof, and will at a still further period in its orbital movement also actuate the cutter transversely of its orbital path, and thereby longitudinally with the work—that is to say, one set of these cam-faces, Figs. 1 and 9, as $a\ a'$, permits the cutter to be moved in its orbital path without longitudinal or transverse movement thereof, and during which portion of its orbital movement it engages the grinding or sharpening devices, as hereinafter set forth, while the next set of said cam-faces, as $b\ b'$, actuates the cutter during its orbital movement longitudinally of, or in a direction opposite to the feed of, the work, to thereby bring the cutter into proper position to cut or sever such work, while the next set of cam-faces, as $c\ c'$, actuates the cutter longitudinally and synchronously with the feeding movement of the work and throughout its severing operation and a portion of its return movement, as will be diagrammatically illustrated hereinafter.

Heretofore in severing or cutting mechanism of this character when it is desired to sharpen or grind the cutting or severing tool or disk it has been necessary to stop the cutting operation of the apparatus and oftentimes necessary to remove such tool or disk in order to properly grind or sharpen the same. This is not only extremely disadvantageous, but involves considerable loss of time and power, and hence increases the cost of running the apparatus. In order, therefore, to obviate these serious disadvantages and permit the automatic sharpening or grinding of the tool or disk while the same is in operation, means or mechanism for accomplishing this purpose is provided and forms a part of this improved cutting or severing apparatus or mechanism, and it comprises in a general way a suitable sharpening or grinding device in position to engage the cutting-face of the disk at a certain predetermined period in the orbital movement of said disk, and which sharpening device is operatively connected with any desired source of power, whereby the same is automatically operable. In the preferred form thereof herein shown and described this sharpening or grinding device preferably comprises a pair of rotatable grinders or disks 60 and 61, of any desired material—such, for instance, as sandstone—and which disks are disposed in a suitable closed casing 63, adjustable toward and from the work-support 21 in a manner hereinafter set forth, and which casing is also herein shown disposed at an angle to such support, whereby the cutter during a part of its orbital movement will be moved in a straight path relatively to the grinding-disks. In the construction shown these disks 60 and 61—one of which, as 61, is preferably larger than the other, and one of which, as 60, is preferably disposed in front of the other—are secured in the casing in a substantially similar manner, and hence a description of one disk-supporting means will be sufficient for both. As one means of supporting these disks in such casing—as, for instance, the disk 60—it is secured on a spindle or shaft 64, one end of which is provided with a flange 65 for holding said disk against detachment in one longitudinal direction, and the opposite end of which is threaded, as at 66, and extends through one of the casing-walls, which is herein shown as formed by the removable casing cover or cap 74, detachably secured in position by suitable fastening devices, such as screws 75. This spindle or shaft 64 is inclosed in a rotatable tubular sleeve 67, likewise having a flange 68, engaging the inner face of the disk 60, and which sleeve 67 has its opposite end extending through the casing-wall and engaging the inner face of a thumb-nut 66', secured on the spindle 64, whereby said disk will be clamped against detachment in the other longitudinal direction.

The tubular sleeve 67 is journaled for rotation in a normally-fixed tubular sleeve or member 69, having a threaded end 70, and which sleeve or member 69 is provided with an annular flange 71, engaging the inner face of the casing wall or cover, and which annular flange is cut away to form elongated ears 72, adapted to fit a suitable elongated recess 73 of the casing-cover 74, and whereby, when an adjusting-nut 70' is turned on said threaded sleeve 69, said sleeve will be firmly held in position for adjustment against rotation, and thus permit the rotation of the tubular sleeve 67 and spindle 64 therein. By means of these elongated recesses in the casing-wall the disks can be adjusted toward each other to take up wear in a manner that will be obvious.

That wall of the casing opposite to the removable cover 74 is cut away, as at 76, sufficiently to permit the cutter to engage the grinders and also clear the casing in its longitudinal movement toward its starting or cutting position.

As a means for rotating the grinding disks or wheels 60 and 61, and also for wiping the same, a suitable disk or wheel 80 is disposed in position below said disks 60 and 61 to frictionally engage the same. This friction-wheel 80 is shown as a hollow flanged wheel and has its periphery covered with felt or other soft substance 81; or the wheel may be entirely composed of felt or other soft substance, if desired. This wheel 80 is supported for rotation and adjustment in a way substantially similar to that set forth for the grinding-disks 60 and 61, and hence a repetition of the description thereof is deemed unnecessary. It will be understood, however, that these grinding and wiping disks may be supported in the casing in any other desired way.

As a means for actuating the wheel 80, and thereby the grinders 60 and 61, that end of the felt-disk spindle or shaft 82 extending beyond the casing-cover 74 carries a worm-wheel 90, meshing with a worm 91, suitably journaled in a bracket 92, adjustably secured to the casing 63 by means of suitable clamping devices 93, and which worm carries a pulley 94, connected by a belt 95 with any suitable source of power, whereby the wiper-wheel is rotated, and thereby the grinding wheels or disks. This casing is supplied with water or other suitable material adapted to be conveyed to the grinding-wheels by the wiper-wheel in a manner that will be obvious.

In order to provide for the wear of the cutter 28 and bring the grinding-wheels into position to always engage the cutter at the proper period, the casing 63, carrying the grinding mechanism, is adjustably supported on the framework or fixture 20 in any suitable way, and in the construction shown the fixture or framework is provided with a dovetailed guide 100, and the casing is provided with a dovetailed way 101, adapted to engage said guide, and with a bracket 102, through which extends an adjusting device in the nature of a thumb-screw 103, the inner end of which engages the guide 100, whereby on the actuation of the same the casing can be moved into any desired position toward or from the cutter.

It will be understood that the various details of mechanism—such, for instance, as the various supporting and adjusting means—can be widely varied without departing from the scope of this invention, and that any suitable means may be used for automatically sharpening or grinding a cutter of this character at a predetermined period in its orbital movement without departing from the scope of the invention.

It will also be understood that while the improved apparatus or mechanism is shown operating to cut a rod, it is nevertheless adapted for use in connection with similar or analogous character of work and on any material—such, for instance, as the cutting of paper or other tubes into short lengths.

In the operation of this improved cutting or severing apparatus or mechanism, power having been applied to the pulleys 32', 46, and 94, the apparatus is placed in operation, the cam 41 being actuated by means of the gears 42 and 43, and thereby rotating the hub or sleeve 33, in which the cutter-spindle 32 is eccentrically journaled, whereby the cutter 28 is carried in its orbital or circuitous path while the same is continuously rotated by means of its spindle 32 and the pulley 32', and by means of said cam also carried transversely of its orbital path or circuit, and thereby longitudinally with the feed of the work, during its cutting operation and a part of its return movement, and then again transversely of its orbital path, and thereby longitudinally of, or in a direction opposite to the feed of, said work and back again to its cutting position, said cutter during a part of its return orbital movement having its cutting-face engaged by the grinding-disks 60 and 61, whereby the same is sharpened, and thus the cutter is automatically maintained in proper condition for use. In order, however, to more explicitly explain and illustrate the various positions of the cutter 28 throughout its orbital and longitudinal or transverse movements, reference is now more particularly made to Figs. 9, 10, and 11, from which it will be seen that in this particular construction the cam, Fig. 9, preferably has three working faces—that is to say, $a$ and $a'$ constituting that portion of the cam which is in position to engage the stud-rollers 50 and prevent transverse or longitudinal movement during the grinding operation of the cutter, Figs. 1, 3, and 4; $c$ and $c'$ constituting that portion of the cam which engages said rollers 50 to secure the longitudinal movement of the cutter with the work to permit the cutting or severing operation, and $b$ and $b'$ constituting that portion thereof which engages the rollers 50 and secures the return movement of the cutter to its cutting position after it has passed through the grinding-wheels.

Referring now to the diagrammatic views, Figs. 10 and 11, when the eccentrically-disposed cutter spindle or shaft 32 is in the position marked 1, Fig. 10, the cutter 28 is in the position also marked 1, Figs. 10 and 11, and is about to commence its severing operation, the work being supported by the under face of the support 27 in a manner heretofore set forth.

When the cutter-spindle 32 has reached the position marked 2, Fig. 10, the cutter 28 has reached the position also marked 2, Fig. 10, in its orbital path and the position marked 2, Fig. 11, in its longitudinal or transverse path, this movement being secured by the cam-faces $c$ and $c'$, and when the cutter-spindle 32 has reached the positions marked 3, 4, and 5, Fig. 10, the cutter has likewise reached the positions in its orbital path also marked 3, 4, and 5, Fig. 10, and reached the positions marked 3, 4, and 5, Fig. 11, in its longitudinal or transverse path, at which latter time the rod or other article has been completely severed and the cutter 28 has commenced its return movement, so that when the spindle 32 has reached the position marked 6, Fig. 10, the cutter has reached the position likewise marked 6, Fig. 10, in its orbital path and has reached the position marked 6, Fig. 11, in its longitudinal or transverse path, the work being continuously fed throughout the movement of the cutter during its severing, grinding, and return operations, so that when the cutter-spindle 32 has reached the position marked 9, Fig. 10, the cutter has reached the position likewise marked 9, Fig. 10, in its orbital movement and has reached the position marked 9, Fig. 11, in its longitudinal or transverse movement and is about to enter between the grinding-wheels, the severed member of the work having fallen and the uncut work having been fed from $f$ to $g$, Fig. 11.

When the cutter-spindle 32 has reached in its orbital path the position marked 11, Fig. 10, the cutter 28 has also reached in its orbital path the position marked 11, Fig. 10, and is directly passing through the grinding-wheels, and when the cutter-spindle 32 has reached the position marked 17, Fig. 10, the cutter has reached the position also marked 17, Fig. 10, in its orbital movement and is about to commence its return longitudinal or transverse movement to bring the same into position to perform its next cutting operation, the work having reached the point $h$, Fig. 11, when said cutter has reached the point 17. During the movement of the cutter-spindle and cutter from the points 9 to 17, Figs. 10 and 11, the cutter has no longitudinal or transverse movement whatever, owing to the straight faces $a$ and $a'$ of the cam.

When the cutter-spindle 32 has reached the position in its orbital path marked 18, Fig. 10, the cutter 28 has reached the position likewise marked 18, Fig. 10, and the position marked 18, Fig. 11, in its return longitudinal or transverse movement, which movement is secured by the cam-faces $b$ and $b'$, which have now come into position, so that the cutter is carried in its orbital and transverse movements to the starting position marked 1, Figs. 10 and 11, during which time the work has been fed forward to the position marked $i$.

From the foregoing it will be seen that in this construction of apparatus and during a part of the orbital movement of said cutter it is carried synchronously with the work, and during which time it performs its cutting operation and clears the work, and that during another part of the orbital movement of the cutter, and which is designated as the "grinding" movement, said cutter has no longitudinal or transverse movement whatever, and that during another part of the orbital movement of the cutter said cutter has a longitudinal or transverse movement of, or is actuated in the opposite direction to the direction of feed of, the work, and which is designated as the "return" movement, to bring the same into position to commence its cutting operation.

It will be understood that while the diagrammatical views show the cam divided into three working faces this improved mechanism is not limited thereto, as it is obvious that other constructions of cam and cam-faces could accomplish the same purpose.

It will also be understood that by forming the cam-faces at various angles the transverse or reciprocative movements of the cutter will be regulated to cut the work into any desired lengths, and that various constructions of cams could be used with the same apparatus.

It will further be understood that these grinding-disks constitute a means of keeping the cutter clean and free of foreign particles, especially if the cutter be used with that class of work in which the cutter would need to be wiped frequently, and hence these disks would therefore constitute wipers as well as sharpeners.

Having described my invention, I claim—

1. The combination with framework; of a hub journaled thereon; a cutter eccentrically carried by said hub; and means for rotating and reciprocating said hub, whereby said cutter will be moved in an orbital path toward and from the work and longitudinally relatively thereto.

2. The combination with framework; of an adjustable hub journaled thereon; a cutter eccentrically carried by said hub; and means for rotating and reciprocating said hub, whereby said cutter will be moved in an orbital path toward and from the work and longitudinally relatively thereto.

3. The combination with framework; of a hub or sleeve journaled thereon; a cutter eccentrically carried by said hub; means for continuously feeding the work to be operated on; and means for rotating said hub, and thereby moving the cutter in an orbital path toward and from the work, and for moving said hub, and thereby the cutter, longitudinally relatively to the work and synchronously with the feed thereof.

4. The combination with framework; of a hub journaled thereon; a rotating spindle eccentrically journaled in said hub; a cutter carried by said spindle; and means for rotating and reciprocating said hub, to thereby move said cutter in an orbital path toward and from the work, and actuate the same longitudinally relatively to said work.

5. The combination with framework; of a hub journaled thereon; a cutter eccentrically carried by said hub; a cam mounted on said hub and adapted to impart reciprocatory movements to the hub, and thereby to the cutter; and means for rotating said hub, to thereby move said cutter in an orbital path toward and from the work.

6. The combination with framework; of a hub journaled thereon; a rotating spindle eccentrically journaled in said hub; a cutter carried by said spindle; a cam mounted on said hub; a gear carried by said cam; and a rotating gear in position to mesh with said cam-gear, whereby said hub will be rotated and reciprocated, to thereby carry the cutter in an orbital path toward and from the work and longitudinally relatively thereto.

7. The combination with framework; of an adjustable bracket supported thereon; means for adjusting said bracket; a hub journaled in said bracket; a cutter eccentrically carried by said hub; and means for rotating and reciprocating said hub, to thereby move said cutter in an orbital path and reciprocate the same synchronously in a longitudinal path.

8. The combination with framework; of a rotatable shaft supported thereon, and carrying a gear; a bracket adjustably supported on said shaft; a hub journaled in said bracket; a cam mounted on said hub and having a gear meshing with the rotatable-shaft gear; means carried by the bracket to engage said cam; a rotatable cutter eccentrically carried by said hub, for movement in an orbital and a longitudinal path, and means for adjusting said bracket, to thereby adjust the cutter toward and from the work.

9. The combination with framework; of work-carrying means supported thereon; means for feeding the work continuously; a rotatable shaft supported on said framework, and carrying a gear; a pair of bracket-arms adjustably supported on said gear-shaft; a hub or sleeve journaled in said bracket-arms, and carrying a cam; a gear carried by said cam and meshing with the shaft-gear; studs carried by the framework, for engaging said cam; a rotatable shaft eccentrically journaled in said hub or sleeve; a cutter carried by said rotatable shaft, and means for adjusting said bracket-arms, to thereby adjust the cutter toward and from the work.

10. The combination with framework; of a rotatable hub journaled thereon for longitudinal movement; a cutter eccentrically carried by said hub; projections on said framework; a cam mounted on said hub, and having three sets of oppositely-disposed cam-faces adapted to engage said projections; and means for rotating said cam, and thereby the hub, whereby said cutter will be carried in an orbital path and longitudinally with the work when one set of cam-faces is in engagement with the projections; and will be carried in its orbital movement without longitudinal movement when another set of cam-faces is in engagement with the projections; and will be moved longitudinally of, or in a direction opposite to, the feed of said work when another set of cam-faces is in engagement with the projections.

11. The combination with framework; of means for continuously feeding the work to be operated on; supporting means journaled in said framework; a cutter eccentrically carried by said supporting means; and means for rotating and reciprocating said supporting means, to thereby move said cutter in an orbital path toward and from the work, and to move said cutter longitudinally with the work during a part of its orbital movement, and longitudinally of, or in a direction opposite to the feed of, the work during another part of its orbital movement.

12. The combination of means for continuously feeding the work to be operated on; a cutter; means for rotating said cutter; cutter-actuating means for moving said cutter in an orbital path toward and from the work and synchronously therewith and with the feed of the work, for actuating said cutter longitudinally relatively to said work; means operable for sharpening or grinding said cutter during a part of its orbital movement; and actuating means for said grinding or sharpening means.

13. The combination of means for feeding the work to be operated on; a cutter; cutter-actuating means for moving said cutter in an orbital path toward and from the work, and for moving said cutter longitudinally with the work during a part of its orbital movement, and longitudinally of, or in a direction opposite to the feed of the work during another part of its orbital movement; means operable for sharpening or grinding said cutter during a part of its orbital movement and intermediate of its longitudinal movements; and actuating means for said grinding or sharpening means.

14. The combination of means for continuously feeding the work to be operated on; a rotatable cutter; means for rotating said cutter; cutter-actuating means for moving said cutter in an orbital path toward and from the work, and for moving said cutter longitudinally with the work during a part of its orbital movement, and longitudinally of, or in a direction opposite to the feed of, the work during another part of its orbital movement; means operable for sharpening or grinding said cutter during a part of its orbital movement and intermediate of its longitudinal movements; and actuating means for said sharpening or grinding means.

15. The combination with framework; of means for continuously feeding the work to be operated on; a hub journaled in said framework; a cutter eccentrically carried by said hub; means for rotating and reciprocating said hub, to thereby move said cutter in an orbital path toward and from the work, and move said cutter longitudinally with the work during a part of its orbital movement, and longitudinally of, or in a direction opposite to the feed of, the work during another part of its orbital movement; means operable for sharpening or grinding said cutter during a part of its orbital movement and intermediate of its reciprocating movements; and actuating means for said sharpening or grinding means.

16. The combination of a cutter; actuating means for moving said cutter in an orbital path; means for sharpening said cutter, and comprising a pair of rotatable grinders or sharpeners supported edge to edge relatively to each other and adapted to engage said cutter during a predetermined part of its orbital movement; and actuating means for said grinders or sharpeners.

17. The combination of a pair of grinding or sharpening disks supported edge to edge and one in front of the other; a friction-wheel supported in position and engaging both of said grinding or sharpening disks; and means for actuating said friction-wheel, to thereby impart movement to said disks.

18. The combination of a tool; a closed casing adjustable toward and from said tool and having a removable cover and having its opposite wall provided with an opening; a pair of grinding or sharpening disks supported in said casing; a friction-wheel also supported in said casing and engaging said grinding or sharpening disks; and means for actuating said friction-wheel.

19. The combination of a casing; a pair of rotatable grinding or sharpening disks supported therein; a disk having a felt periphery also carried in said casing and frictionally engaging said grinding or sharpening disks; a worm-wheel operatively connected with the felt disk; and a worm in engagement with said worm-wheel for imparting motion thereto.

20. The combination with framework; of a rotating cutter; means for moving said cutter in an orbital path; a closed casing adjustable on said framework, and having an opening in its wall; a pair of grinding or sharpening disks having their peripheries rotating adjacent to said opening; a friction-wheel in said casing, and engaging the grinding or sharpening disks; a worm-wheel operatively connected with said friction-wheel; and a worm in mesh with said worm-wheel, whereby said grinding or sharpening disks will be rotated to engage the cutter during a predetermined period of its orbital movement.

21. The combination of a closed casing, one of the walls thereof having an elongated recess; a normally-fixed, adjustable tubular sleeve having an annular flange engaging the inner face of said wall and an elongated ear supported in said elongated recess and having a screw-threaded end adapted to receive an adjusting-nut, whereby said fixed sleeve is adjustable relatively to the casing; a rotatable tubular sleeve supported in said normally-fixed sleeve, and having a flanged end; a spindle supported in said rotatable tubular sleeve, and also having a flanged end and a threaded end adapted to receive a clamp-nut; and a disk carried on said spindle and intermediate of said flanges.

22. The combination with framework; of means for feeding the work to be operated on continuously; a rotatable shaft supported on said framework; a bracket adjustably supported on said shaft; means for adjusting said bracket; a rotatable and reciprocating hub or sleeve journaled in said bracket, and carrying a cam having a gear, whereby said hub is rotated and reciprocated; a gear on said rotatable shaft in mesh with said cam-gear; projections carried by said bracket and adapted to engage said cam; a rotatable shaft eccentrically journaled in said hub; a cutter carried by said eccentrically-disposed shaft; and means for sharpening or grinding said cutter during a predetermined period of its orbital movement, and comprising a casing adjustable on said framework toward and from said cutter; a pair of grinding or sharpening disks journaled in said casing; a friction-disk engaging said grinding or sharpening disks; a worm-wheel operatively connected with the friction-disk; and a worm meshing with said worm-wheel, for imparting motion thereto.

23. The combination with framework; of a work-carrying support having a beveled face; means for feeding the work relatively to said support; a cutter; and means for actuating said cutter in an orbital path toward and from the work, and longitudinally relatively to the work, to thereby permit said cutter to commence its severing operation adjacent to the inner portion of said beveled face of the support, and thereby complete its cutting operation while the work is supported on said support.

FRANCIS H. RICHARDS.

Witnesses:
FRED. J. DOLE,
GEO. A. HOFFMAN.